(12) United States Patent
Chen et al.

(10) Patent No.: US 10,400,733 B2
(45) Date of Patent: Sep. 3, 2019

(54) VEHICLE BATTERY CONTROL SYSTEMS AND METHOD

(71) Applicant: Ford Global Technologies, LLC, Dearborn, MI (US)

(72) Inventors: Hanyang B Chen, Canton, MI (US); Michael J Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 15/613,064

(22) Filed: Jun. 2, 2017

(65) Prior Publication Data

US 2018/0347535 A1 Dec. 6, 2018

(51) Int. Cl.
*F02N 11/08* (2006.01)

(52) U.S. Cl.
CPC ..... *F02N 11/0825* (2013.01); *B60Y 2300/192* (2013.01); *B60Y 2300/91* (2013.01); *F02N 2200/061* (2013.01); *F02N 2200/062* (2013.01); *F02N 2200/064* (2013.01)

(58) Field of Classification Search
CPC ............ F02N 11/08; F02N 11/0825; F02N 2200/061; F02N 2200/062; F02N 2200/064; B60Y 2300/192; B60Y 2300/91
See application file for complete search history.

(56) References Cited

U.S. PATENT DOCUMENTS

| | | | | |
|---|---|---|---|---|
| 5,751,137 A * | 5/1998 | Kiuchi | ............... | B60K 6/46 322/14 |
| 7,036,477 B1 * | 5/2006 | Thompson | ............... | F02D 17/04 123/179.4 |
| 7,347,175 B2 * | 3/2008 | Lupo | ............... | F02D 41/042 123/179.4 |
| 7,928,735 B2 | 4/2011 | Huang et al. | | |
| 9,181,895 B2 | 11/2015 | Roberts et al. | | |
| 9,573,580 B2 * | 2/2017 | Seto | ............... | B60L 58/12 |
| 9,776,621 B2 * | 10/2017 | Sato | ............... | B60W 20/11 |
| 2011/0208410 A1 | 8/2011 | Izumoto et al. | | |
| 2012/0029852 A1 | 2/2012 | Goff et al. | | |
| 2015/0268309 A1 | 9/2015 | Kim | | |

FOREIGN PATENT DOCUMENTS

| | | |
|---|---|---|
| CN | 103543404 A | 1/2014 |
| FR | 3033954 A1 | 9/2016 |
| GB | 2536559 A | 9/1916 |

OTHER PUBLICATIONS

Search Report dated Nov. 12, 2018 for GB Patent Application No. GB 1808955.7 (4 pages).
BU-908: Battery Management System (BMS), Battery University, http://batteryuniversity.com/learn/article/how_to_monitor_a_battery.

* cited by examiner

*Primary Examiner* — Hieu T Vo
(74) *Attorney, Agent, or Firm* — Frank Lollo; Neal, Gerber & Eisenberg LLP; James P. Muraff

(57) ABSTRACT

System and method are disclosed for detecting and refreshing an aged battery in a vehicle with a start-stop system. An example vehicle includes an engine configured to operate in a start-stop mode and a power management system. The power management system is configured for determining that a charge acceptance value of a battery is below a threshold, responsively disabling the start-stop mode and displaying a message via a display, refreshing the battery and enabling the start-stop mode after refreshing the battery.

19 Claims, 3 Drawing Sheets

VEHICLE BATTERY CONTROL SYSTEMS AND METHOD

TECHNICAL FIELD

The present disclosure generally relates to vehicle battery control systems and methods and, more specifically, systems and methods for detecting and refreshing an aged vehicle battery in a vehicle with a start-stop system.

BACKGROUND

Modern vehicles may include electronic systems that require a base level of available power to operate. For example, many vehicles include climate control systems, power windows and locks, connectivity systems (GPS, Bluetooth, etc.) and electronic power assisted steering (EPAS). Further, some vehicles may include a start-stop mode, in which the engine turns off and on to conserve fuel.

Each of these electronics systems may receive power from the vehicle alternator and battery. Over time, the vehicle battery may become aged, resulting in reduced performance.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle battery management in a vehicle with a start-stop system. An example disclosed vehicle includes an engine configured to operate in a start-stop mode, and a power management system. The power management system is configured for determining that a charge acceptance value of a battery is below a threshold, responsively disabling the start-stop mode and displaying a message via a display; refreshing the battery, and enabling the start-stop mode after refreshing the battery.

An example disclosed method includes determining, by a power management system of a vehicle, that a charge acceptance value of a battery of the vehicle is below a threshold. The method also includes responsively disabling a start-stop mode of an engine of the vehicle and displaying a message via a display. The method further includes refreshing the battery. And the method yet further includes enabling the stop start mode after refreshing the battery.

A third example may include means for determining, by a power management system of a vehicle, that a charge acceptance value of a battery of the vehicle is below a threshold. The example also includes means for responsively disabling a start-stop mode of an engine of the vehicle and displaying a message via a display. The example further includes means for refreshing the battery, and means for enabling the stop start mode after refreshing the battery.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
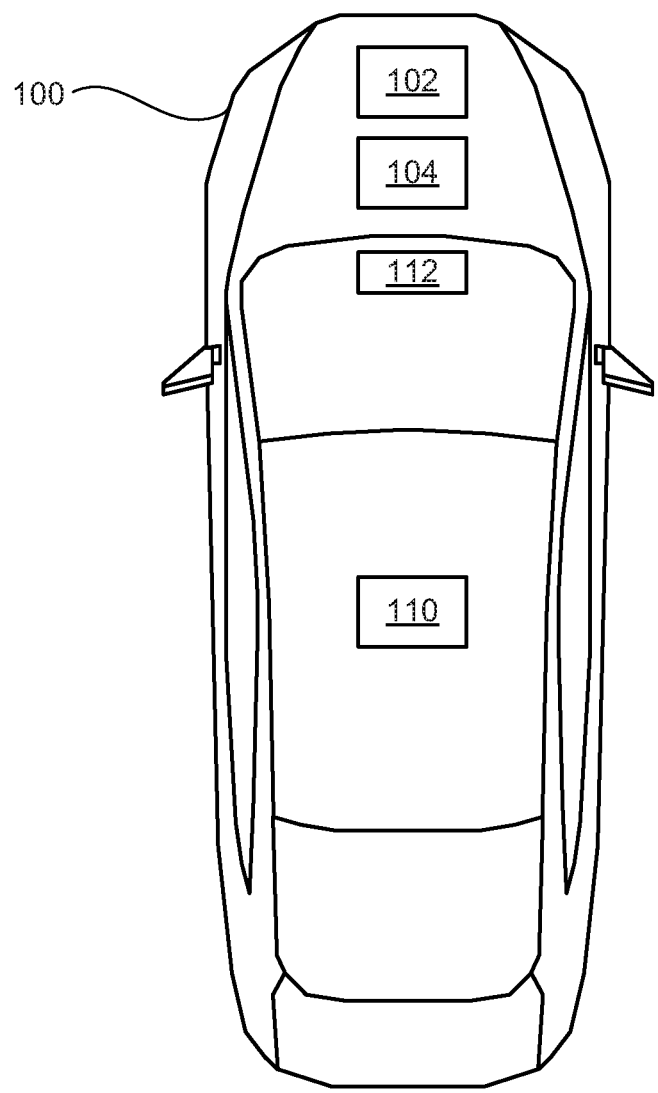
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to battery management in vehicles with start-stop systems. Vehicles may include one or more electronic systems which require a threshold level of power to operate. For instance, some vehicles may include power adjusted seats, computing systems and displays, heated seats and steering wheel, lights, external and internal relays, and more. Further, some vehicles may include electronic power assisted steering (EPAS) which may require, in some examples, seventy-five amps of current to operate effectively during certain operating conditions.

One particular system which some vehicles may employ is a start-stop mode for the engine. The start-stop mode may enable the vehicle engine to turn off and on automatically (for instance when stopped at a stop light). This may allow the vehicle to conserve fuel and reduce emissions. The process of restarting the engine may require a certain amount of power from the battery. As such, the battery must have enough power, otherwise the start-stop system will not be able to operate properly.

In some examples, a vehicle battery may experience sulfation over time (among other issues), causing the battery to have reduced performance. The battery may have a reduced capacity, may not charge as quickly, and/or may provide a reduced current and/or voltage. Electrical systems that rely on the battery to operate, such as the start-stop system, may therefore run into problems. As such, it may be beneficial to detect when a given battery has a reduced performance, so as to take corrective measures.

With these concerns in mind, example vehicles, systems, devices, and methods disclosed herein may provide the ability to detect vehicle battery problems, and refresh the battery to return some of the performance.

An example vehicle may include an engine configured to operate in a start-stop mode. Operating in the start-stop mode may include controlling the engine to turn off and on automatically, for example by turning off when the vehicle is stopped, and restarting when a driver of the vehicle releases the brake pedal. Restarting the engine after it has been turned off may require a high current for a short amount of time.

The vehicle may also include a power management system. The power management system may detect, measure, or receiving information about various aspects of the electrical systems of the vehicle, including the battery. In some examples, the power management system may be configured for determining that a charge acceptance value of the battery is below a threshold. The charge acceptance value may be correlated with an age of the battery, and may be a good indicator of the quality of the battery.

The charge acceptance of a battery may be a level of current when the battery is being charged, and it is approximately inversely proportional to the state of charge. For instance, as a battery is charged from 20% to 80% full, the charging current may drop. As such, the charge acceptance value may be tied to or depend on the present state of charge of the battery. And the threshold may also be tied to or depend on the state of charge. It is valuable to mention that battery acceptance may also be dependent on battery temperature. Therefore, the charge acceptance threshold used in this disclosure may be determined based on both battery size and battery temperature.

Responsive to determining that the charge acceptance of the battery is below the threshold, the power management system may be configured for disabling the start-stop mode and displaying a message via a display. Disabling the start-stop mode may prevent battery degradation caused by the start-stop system. And in the event the battery performance is bad enough to interfere with the start-stop system operation, disabling the start-stop mode may prevent the vehicle from becoming stranded due to a dead battery caused by the start-stop system.

The message may indicate to a drive of the vehicle that the quality of the battery has dropped, and the vehicle will enter a refresh mode to attempt to restore some of the battery performance.

The power management system may then refresh the battery. Refreshing the battery may include increasing a charging voltage used for charging the battery for a period of time, such as three hours. The increased charging voltage may alleviate some of the sulfation, and/or may bring back some of the battery performance. In some cases, the refresh mode may monitor the charge acceptance of the battery. When the charge acceptance returns above the threshold level, the power management system may responsively enable the start-stop mode.

In some examples, the refresh mode may occur over several days. Where the refresh mode is initiated and scheduled to last for three hours, the three hour period may be broken into blocks during the time the vehicle is driven. For instance, if a vehicle is driven for one hour at a time, the refresh mode may last for three driving sessions, which may occur of the course of several days.

When a 12-volt lead-acid battery is close to fully charged (i.e., SOC>80%), in industry it is recommended to charge the battery with float charge voltage (about 13.6V at 25° C.). With float charge the battery can be charged mildly for a long time without unexpected battery electrolyte loss due to high gassing rate. Float charge is typically used for stationary batteries.

In vehicle it is important to charge battery SOC fast to recover battery loss due to vehicle KOL (Key-off-Load, battery discharging current in vehicle sleep mode overnight). Typically the vehicle alternator or DCDC voltage will be set to about 14.5V (~5-7% higher than float charge voltage) at 25° C. and sometimes it is called vehicle conventional charge voltage. With conventional charge voltage the battery may have higher charging speed without substantial battery electrolyte loss due.

When a lead-acid battery is aged with sulfation and/or stratification, it is recommended to implement an equalize charge process for maintenance of battery. With the equalize charge process, charge voltage may be set to about 10% higher than float charge (about 15V at 25° C.). With this high charging voltage 15V, the battery will be quickly charged to full and battery gassing rate will substantially higher than in float charge. The aged battery could be partially recovered from sulfation, and may also be helpful in removing battery stratification, which is harmful for battery life. However, the battery gassing rate is high and battery electrolyte loss (water loss) could be high if the battery is charged within this equalize charge voltage. Typically the equalize charge process is implemented for every a couple of months, and each equalize charge process lasts for around one to several hours. Therefore, high battery water loss due to equalize charge is avoided.

Battery equalize charge process has also been used in vehicle battery charging control and sometimes it is called as battery refresh process. In vehicle battery management system may enter battery refresh mode once every three months with charging voltage set to about 10% higher than float charge, and each refresh process may last for an accumulated charging hours of 3 to 5 hours.

Lab and vehicle field tests showed that battery sulfation recovery is much more efficient with charging voltage 15% (but not 10%) higher (15.7V or higher at 25° C.) than float charge voltage. With a voltage 15% higher than float charge for battery refresh there will be much more opportunity to re-enable vehicle auto start-stop function after battery is aged, and battery electrolyte loss is still acceptable based on lab data analysis. In this disclosure, the vehicle may enter a battery refresh mode immediately after detection of aged battery (as depicted in block 312 in FIG. 3 with Counter>3), instead of waiting every three months. In addition, the battery refresh operation is paused when battery temperature is higher than a pre-determined threshold, which is typically set to 65° C. for battery extreme high temperature protection.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include an engine 102, a battery 104, a power management system 110, and a display 112. Engine 102 may be configured to operate in a start-stop mode. When the start-stop mode is disabled, the engine may function as a typical engine functions. For instance, by turning on when the vehicle is started, and turning off when the vehicle is shut off. When the start-stop mode is disabled, the engine may not automatically turn on and off.

Alternatively, when the start-stop mode is enabled, the engine 102 (and/or one or more engine control systems) may function by receiving input from one or more vehicle systems to determine whether to automatically turn off and on. For instance, the engine may shut off when the vehicle is stationary for a period of time, such as when vehicle 100 is waiting at a stoplight. The engine may then automatically turn on based on one or more inputs, such as when the driver releases a brake pedal, after an amount of time has elapsed, or some other signal is received. This restarting of the engine may require power from the battery 104.

The battery 104 may be any battery suitable for use in a vehicle. For instance, battery 104 may be a 12V lead-acid battery. Battery 104 may also have one or more corresponding metrics, such as a maximum capacity, a state of charge (SOC), temperature, voltage, current, and more. Over time, the capacity may degrade, such that a battery previously able to be charged to 100% capacity may only be able to reach 75% or lower, regardless of the time for which the battery is charged.

In some examples, a start-stop mode of engine 102 may require a threshold SOC of the battery, due to safety concerns. As discussed above, where the battery drops below a threshold SOC, the start-stop functionality may fail, causing the vehicle to be stranded. As such, a lower threshold of the battery SOC for the start-stop mode to function may be, for example, 70%.

Charging battery 104 may include providing a voltage and current to the battery higher than a normal voltage and/or current. As battery 104 is charged, the battery SOC may increase, and a corresponding charging current may decrease. In effect, the charging current may be higher when the battery is at a low SOC, and the charging current may decrease as the battery becomes more charged with higher SOC.

In some examples, the charging current may be called the charge acceptance of the battery. The charge acceptance may reflect an ability of battery 104 to accept charge. And as such, the charge acceptance may follow a pattern as the battery is charged. In some examples, the charge acceptance may follow an asymptotic approach to a maximum SOC as battery 104 is charged.

For the purpose of explanation, two typical 12-V lead-acid batteries with rated capacity of 70 AmpHour are described below. A first battery may be a relatively new, healthy battery. When the first battery is charged, it may begin with an SOC of 20% and a charge acceptance of 60 Amps. When the battery is charged over the course of one hour, the SOC may increase to 80%, and the charge acceptance may drop to 15 amps, following a smooth curve. During the hour for which the first battery was being charged, power management system 110 may estimate an expected charging time until the first battery reaches 70% SOC. The expected charging time may be used as a metric to determine whether the first battery is aged.

A second battery may be an aged, unhealthy battery. When the second battery is charged, it may begin with an SOC of 20% and a charge acceptance of 30 Amps. However, when the second battery is charged over the course of one hour, the SOC may increase to 60% and the charge acceptance may decrease to 5 Amps or lower. Further, the power management system 110 may estimate the expected charging time to reach 70%, and may conclude that the estimated time is greater than a threshold, or that 70% SOC may never be reached.

Power management system 110 of vehicle 100 may be configured to determine one or more characteristics of battery 104, and carry out one or more actions responsive to the determinations.

In some examples, power management system 110 may be configured for determining that a charge acceptance value of the battery 104 is below a threshold value. As described above, the charge acceptance may be a charging current, and may follow a curve as the SOC of battery 104 increases. As such, power management system 110 may determine the charge acceptance over time, or a charge acceptance curve, is below a threshold.

In some examples, power management system 100 may be configured for determining that an expected charging time to reach a particular SOC is greater than a threshold time. This may include, for instance, determining that battery 104 is expected to take greater than 5 hours to reach a 70% SOC.

The threshold may depend on one or more characteristics of battery 104, such as a size (capacity), SOC, temperature, charging voltage, or one or more time-based metrics. The time-based metrics may include an estimated charging time to reach a particular SOC, and/or an estimated charging time to increase the SOC by a particular amount. For instance, the threshold may be set such that a charge acceptance of the battery below the threshold is an aged battery, and a charge acceptance above the threshold is a non-aged battery.

In some examples, the power management system 110 may determine the charge acceptance of battery 104 at a plurality of points in time, or for a plurality of distinct periods of time. This may enable power management system 110 to determine whether battery 104 is aged, and/or whether the charge acceptance is below the threshold more robustly. For instance, power management system 110 may wait a predetermined amount of time (e.g., 10 minutes) after vehicle 100 is turned on to allow the battery and various systems to stabilize. Power management system 110 may then sample the charge acceptance value after the predetermined period of time, compare to the threshold, and determine that the charge acceptance is below the threshold. This process may be repeated two or more times, and in some examples where the vehicle has been cycled off and on between readings. In some examples, the readings may take place over the course of two or more days. After the process has been completed two or more times, and each time power management system 110 determines that the charge acceptance value is below the threshold, it may then be determined that the battery charge acceptance is low, and one or more actions may be taken.

Power management system 110 of vehicle 100 may be configured for disabling the start-stop mode of engine 102. This may be done responsive to determining that the charge acceptance value of battery 104 is below the threshold. Disabling the start-stop system may be done automatically, and a corresponding message may be displayed on a display 112 of vehicle 100. The message may be audio and/or visual, and may indicate that battery 104 is aged. The message may indicate that the SOC is below a threshold, that the charge acceptance is below a threshold, and/or that the start-stop mode has been or will be disabled. Further, the message may indicate that power management system 110 will be or has entered a battery refresh mode, in which the system will attempt to restore the capacity, SOC, and/or functionality of the battery.

Power management system 110 may be configured for refreshing battery 104. Refreshing battery 104 may include entering a refresh mode. The refresh mode may include increasing a voltage and/or current applied when charging the battery.

In some examples, the power management system 110 may be in the refresh mode for a predetermined period of time. The period of time may be three hours, for example, and may be broken up into blocks. The blocks may occur over the course of several hours, days, or more. For instance, a vehicle may be driven for 1 hour per day, such that the three hour refresh period extends over three days. As such, the refresh mode may span a plurality of vehicle on-off cycles over the course of several days.

In some examples, power management system 110 may monitor the charge acceptance, SOC, and/or one or more other metrics during the refresh mode. When the charge acceptance reaches or is greater than the threshold, power management system 110 may responsively enable the start-stop mode of engine 102. Further, power management system 110 may monitor battery 104 during the refresh mode, and may estimate a charging time to reach a particular SOC or to increase by a particular SOC. This information may be used to determine a status of the battery, and whether one or more actions should be taken.

Once the refresh mode time period has elapsed, or based on one or more other determinations, power management system 110 may enable the start-stop mode of the engine. Power management system 110 may also display a corresponding message on display 112.

Figure 2:
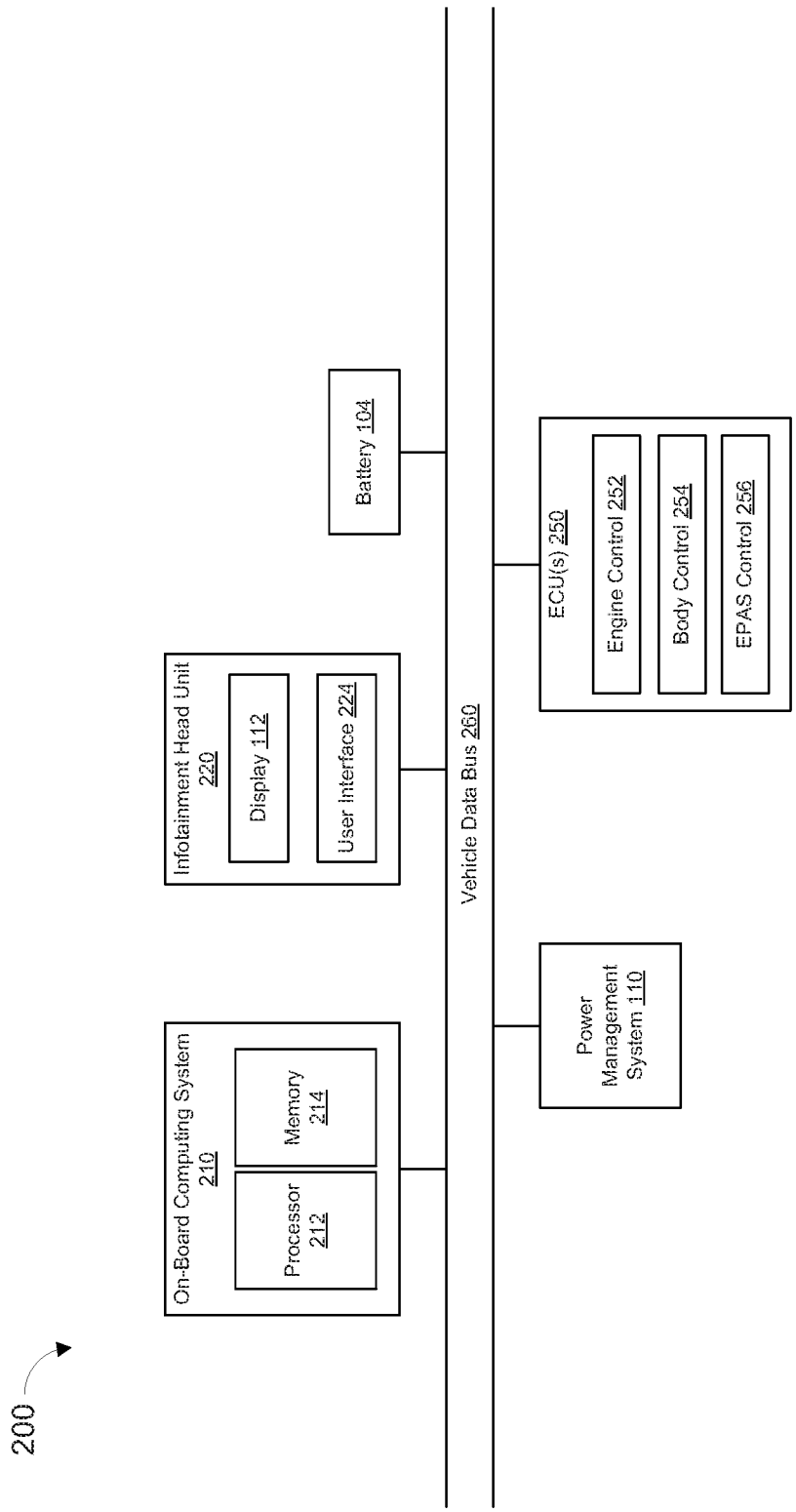
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 210, infotainment head unit 220, power management system 110, battery 104, electronic control unit(s) 250, and vehicle data bus 260.

The on-board computing system 210 may include a microcontroller unit, controller or processor 212 and memory 214. The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 112 and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 210. Additionally, the infotainment head unit 220 may display the infotainment system on, for example, a center console display of vehicle 100 (such as display 112).

Power management system 110 may include a dedicated processor and/or memory, or may share a processor and/or memory with on-board computing system 210. Power management system may be configured to carry out the functions or actions described herein.

Battery 104 may be any battery suitable for use in a vehicle, such as vehicle 100. Battery 104 may include one or more sensors, systems, or devices configured to provide information about the battery health, SOC, temperature, charging current, and other characteristics.

The ECUs 250 may monitor and control subsystems of vehicle 100. ECUs 250 may be the electrical load 106 discussed with reference to FIGS. 1. As such, one or more ECUs may be enabled, disabled, or otherwise modified to reduce a power draw of the ECU. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the on-board computing system 210, infotainment head unit 220, power management system 110, battery 104, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) FD) bus (ISO 11898-7).

Figure 3:
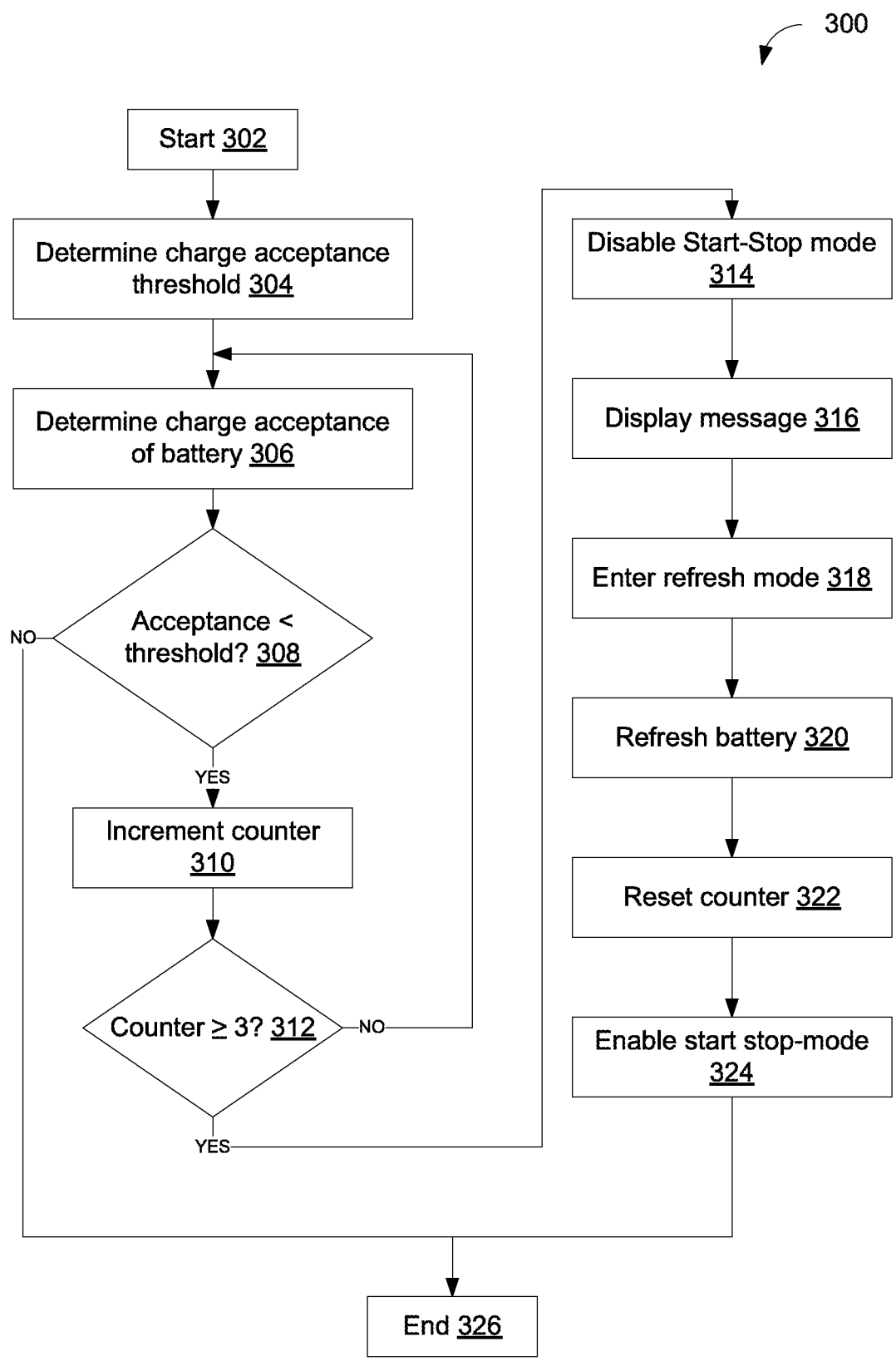
FIG. 3 illustrates a flowchart of an example method according to embodiments of the present disclosure.

FIG. 3 illustrates a flowchart of an example method 300 according to embodiments of the present disclosure. Method 300 may enable one or more systems to determine the status of a vehicle battery used in a vehicle having a start-stop function, and responsively take action when the battery is aged, degraded, or otherwise problematic. The flowchart of FIG. 3 is representative of machine readable instructions that are stored in memory (such as memory 212) and may include one or more programs which, when executed by a processor (such as processor 210) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining a charge acceptance threshold. The charge acceptance threshold may be a value tied to the capacity, size, temperature, SOC, or other characteristic of the vehicle battery. The threshold may be set based on safety concerns, such that any battery with a charge acceptance value greater than the threshold will enable a start-stop system for the engine to operate properly, without fear that the battery will die or fail to provide sufficient power to restart the engine.

At block 306, method 300 may include determining a charge acceptance value of the battery. As disclosed above, the charge acceptance may be a charging current of the battery. Alternatively, the charge acceptance may be a value determined based on the charging current, and/or may be a value over time, such that the charge acceptance may be a plotted curve of the charging current.

Determining the charge acceptance may include determining an estimated charging time required for the battery to charge to a given SOC (e.g., 70%). The charge acceptance threshold may include a length of time required for a battery to reach the given SOC.

Block 308 of method 300 may include determining whether the charge acceptance is greater than the threshold. This may include comparing the determined charge acceptance, plotted charge acceptance over time, and/or estimated charging time required to reach the given SOC to the threshold. If the acceptance is not less than the threshold (i.e., the battery is operating above the threshold for an "aged" battery), then method 300 may end. However if the acceptance is below the threshold, method 300 may include incrementing a counter at block 310.

Block 312 of method 300 may then include determining whether the counter is equal or greater than three. The number three has been included for the sake of example, but it should be understood that other number (1, 2, 3, etc.) may be used as well. If the counter is less than three, method 300 may include reverting back to block 306. This may allow method 300 to determine at three or more separate determinations that the battery is operating below an optimal quality. This may add confidence to the determination that the acceptance is below the threshold.

Where the counter is greater than or equal to three, method 300 may include disabling the start-stop mode at block 314. This may prevent the start-stop mode from drawing power from the aged battery, thus avoiding one source of potential drain on the battery.

At block 316, method 300 may include displaying a message. The message may indicate that the battery has been flagged as aged, that the start-stop mode has been disabled, that the battery will be refreshed, or any other information.

At block 318, method 300 may include entering the refresh mode, and at block 320, refreshing the battery. Refreshing the battery may include charging the battery at a higher than normal voltage for a period of time, such as several hours.

At block 322, method 300 may include resetting the counter. And at block 324, method 300 may include enabling the start stop mode. This may occur automatically after the battery has been refreshed. Method 300 may then end at block 326.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an engine configured to operate in a start-stop mode; and
    a power management system for:
        determining that a charge acceptance value of a battery is below a threshold;
        responsively disabling the start-stop mode and displaying a message via a display;
        refreshing the battery; and
        enabling the start-stop mode after refreshing the battery.

2. The vehicle of claim 1, wherein the charge acceptance value comprises a charging current for the battery.

3. The vehicle of claim 1, wherein the threshold is based on a size and temperature of the battery.

4. The vehicle of claim 1, wherein determining that the charge acceptance value of the battery is below the threshold comprises:
    determining the charge acceptance value of the battery at a plurality of points in time; and
    determining that the charge acceptance value of the battery at each point in time is below the threshold.

5. The vehicle of claim 4, wherein the plurality of points in time occur over two or more days.

6. The vehicle of claim 1, wherein the message comprises an indication that the battery will be refreshed.

7. The vehicle of claim 1, wherein refreshing the battery comprises the power management system entering a refresh mode, wherein the refresh mode comprises charging the battery with a first voltage, wherein the first voltage is greater than a second voltage used to charge the battery when not in the refresh mode.

8. The vehicle of claim 7, wherein the first voltage is 15% greater than a battery float charge voltage.

9. The vehicle of claim 7, wherein the refresh mode further comprises:
supplying the first voltage to the battery for a time period; and
determining that the charge acceptance value of the battery is above the threshold,
wherein enabling the start-stop mode after refreshing the battery comprises enabling the start-stop mode responsive to determining that the charge acceptance value of the battery is above the threshold.

10. The vehicle of claim 1, wherein refreshing the battery comprises the power management system entering a refresh mode that spans a plurality of vehicle on-off cycles.

11. A method comprising:
determining, by a power management system of a vehicle, that a charge acceptance value of a battery of the vehicle is below a threshold;
responsively disabling a start-stop mode of an engine of the vehicle and displaying a message via a display;
refreshing the battery; and
enabling the start-stop mode after refreshing the battery.

12. The method of claim 11, wherein the charge acceptance value comprises a charging current for the battery.

13. The method of claim 11, wherein the threshold is based on a size and a temperature of the battery.

14. The method of claim 11, wherein determining that the charge acceptance value of the battery is below the threshold comprises:
determining the charge acceptance value of the battery at a plurality of points in time; and
determining that the charge acceptance value of the battery at each point in time is below the threshold.

15. The method of claim 14, wherein the plurality of points in time occur over two or more days.

16. The method of claim 11, wherein the message comprises an indication that the battery will be refreshed.

17. The method of claim 11, wherein refreshing the battery comprises the power management system entering a refresh mode, wherein the refresh mode comprises charging the battery with a first voltage, wherein the first voltage is at least 15% greater than a float charge voltage used to charge the battery when not in the refresh mode.

18. The method of claim 17, wherein the refresh mode further comprises:
supplying the first voltage to the battery for a time period; and
determining that the charge acceptance value of the battery is above the threshold,
wherein enabling the start-stop mode after refreshing the battery comprises enabling the start-stop mode responsive to determining that the charge acceptance value of the battery is above the threshold.

19. The method of claim 11, wherein refreshing the battery comprises the power management system entering a refresh mode that spans a plurality of vehicle on-off cycles.

* * * * *